G. F. MILLER.
FLY KILLER.
APPLICATION FILED JUNE 21, 1913.
1,118,508.
Patented Nov. 24, 1914.
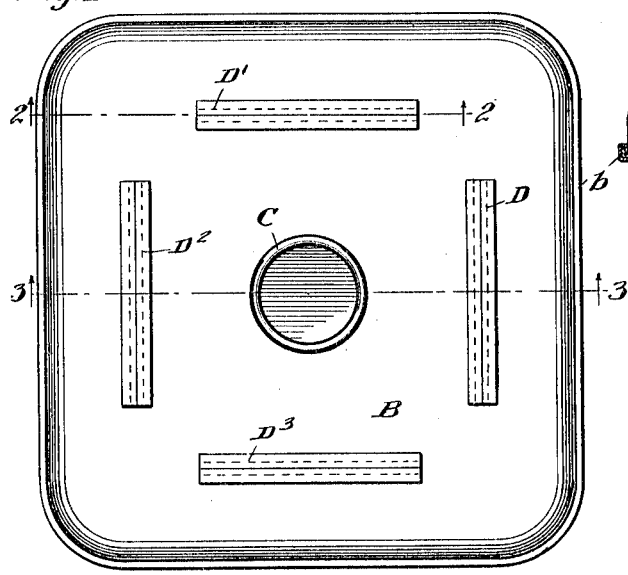
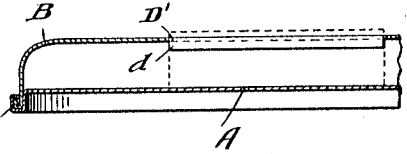
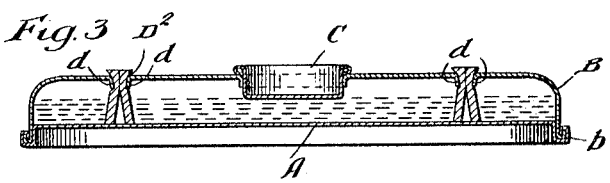
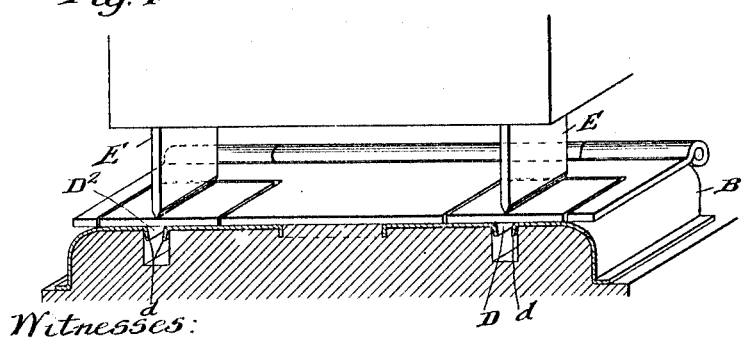
Witnesses:
Wm. Geiger
Esther Abrams.
Inventor:
George F. Miller
By Munday, Evarts, Adcock & Clarke.
Attys.

UNITED STATES PATENT OFFICE.

GEORGE F. MILLER, OF BROOKLYN, NEW YORK, ASSIGNOR TO AMERICAN CAN COMPANY, OF NEW YORK, N. Y., A CORPORATION OF NEW JERSEY.

FLY-KILLER.

1,118,508.  Specification of Letters Patent. Patented Nov. 24, 1914.

Application filed June 21, 1913. Serial No. 774,968.

*To all whom it may concern:*

Be it known that I, GEORGE F. MILLER, a citizen of the United States, residing in Brooklyn, in the county of Kings and State of New York, have invented a new and useful Improvement in Fly-Killers, of which the following is a specification.

This invention relates to an improvement in fly killers and consists in the novel devices and combinations of parts and devices hereinafter more fully set forth and made the subject matter of claim.

In the accompanying drawing which forms a part of this specification, Figure 1 is a top or plan view of the fly killer; Fig. 2 is a partial section of the same on the line 2—2 of Fig. 1; Fig. 3 is a section on the line 3—3 of Fig. 1; Fig. 4 is a respective, diagrammatic view illustrating the manner of applying the wicks.

The subject matter of the present invention is a fly killer of the kind in which a wick saturated with poison is kept wet by capillary attraction which draws water up from a reservoir placed below the wick. And in the present instance the apparatus is made shallow and flat, both in order that the wicks may be short and in order that the device may lay flatwise and thus danger of upsetting the same may be lessened. A difficulty in the cheap production and manufacture of fly killers of this general type has been the threading of the wicks in place after the structure is completed. In the present invention this difficulty is entirely overcome by the structure of the device, which permits the rapid and ready insertion and retention of the wicks and at the same time preserves all the advantages of the best modern form of fly killers of this general type.

One of the desirable features of this type of fly killer is that the wicks shall be short; that the reservoir for water shall be shallow and widely extended; that the device as a whole shall be flat in structure; that the extended surface of the fly killer shall present a wide area of poison impregnated surface, so that as the fly killer lies flat a current of air passing over the same in whatsoever direction shall present a wide band or area of air containing the scent of the moistened poisonous wicks to better attract the flies which are accustomed to fly against the air current toward the source of the smell which attracts them. All of these advantages are attained in the present invention by the very simple expedient of constructing the wick openings in the upper surface of the flat inclosed moisture container, in the form of a long slot and placing two or more such slots at an angle to each other. This form of which slot enables the ready application of a double felt wick by the means of a blade, as will presently be described, and also enables a wide extent of air to be influenced by the emanation from the wick in whatever direction the air current may be moving.

In the accompanying drawing A is the sheet metal bottom of the flat vessel for containing the liquid part of the fly poison; B is the combined walls and cover of the vessel, which may be made in a single piece and double-seamed to the bottom as at $b$; C is the removable sheet metal plug for giving access to the interior of the vessel for convenience in filling the same with the liquid contents. The upper surface of the cover B is cut with the slots D, $D^1$, $D^2$, $D^3$. The sheet metal edges of these slots D, etc., are turned down as at $d$ at each side of the slot. The two flanges $d$ thus formed are pointed slightly toward each other, making a passage-way for the wick, which is slightly smaller at its lower part than at its upper part, thus causing said passage-way to act as a detainer for the wick when inserted to retard the too ready withdrawal and at the same time to permit the easy insertion of the wick from above.

In practice in the manufacture of the fly killer the wicks, consisting of felt saturated with a fly poison, and preferably also with some substance which will give off an attractive odor, are first cut into the form of strips of a width equal to twice the required depth of the wick and of a length equal to the length of the slot D or $D^1$, etc. To insert the wick this strip is laid along the slot and a sharp-edged blade, as for example the blade E, standing parallel with and central above the slot D, is forced down upon the double width strip of felt, thereby folding the same in its center and when the bottom of the container is reached a further descent of the blade operates to cut the strip into two parts, after which the blade is withdrawn the detaining form of the wick slot preventing the withdrawal of the two parts of the wick. This operation of inserting the wicks may be performed either before or after the bottom A and cover B of the container are united together by the double seam b.

The fly killer is designed to be sold dry, which permits its easy shipment and handling and when the same is to be used the plug C is withdrawn, ordinary water poured into the container and the plug closed, after which the capillary attraction of the wicks will draw the water up through the same to the outside upper surface where the odor will be disseminated into the air, the flies attracted and killed by the sipping of the poisoned water.

I claim:

A liquid container for a fly killer, having a sheet metal top formed with long wick slots, the edges of which slots are arranged opposite to and at the same level with each other, and are formed with two separate bent-down flanges arranged parallel and close together, and inclined toward each other and adapted to spring toward or apart from each other, the said flanges forming a perpendicular opening from end to end of the slot for the introduction of a wick-inserting and cutting tool together with a flat doubled wick, said flanges being adapted to independently spring inward and acting to strip the two parts of the wick from the knife after the wick has been cut at its middle, below the said slot.

GEORGE F. MILLER.

Witnesses:
EDW. Q. BAKER,
CHARLES ASCHER.

Copies of this patent may be obtained for five cents each, by addressing the "Commissioner of Patents, Washington, D. C."

It is hereby certified that in Letters Patent No. 1,118,508, granted November 24, 1914, upon the application of George F. Miller, of Brooklyn, New York, for an improvement in "Fly-Killers," errors appear in the printed specification requiring correction as follows: Page 1, line 63, for the word "which" read *wick;* same page, line 89, after the word "withdrawal" insert the words *of the wick;* and that the said Letters Patent should be read with these corrections therein that the same may conform to the record of the case in the Patent Office.

Signed and sealed this 26th day of January, A. D., 1915.

[SEAL.]
R. F. WHITEHEAD,
*Acting Commissioner of Patents.*